(12) United States Patent
Cosoi

(10) Patent No.: US 8,335,383 B1
(45) Date of Patent: Dec. 18, 2012

(54) IMAGE FILTERING SYSTEMS AND METHODS

(75) Inventor: Catalin A Cosoi, Bucharest (RO)

(73) Assignee: Bitdefender IPR Management Ltd., Nicosia (CY)

( * ) Notice: Subject to any disclaimer, the term of this patent is extended or adjusted under 35 U.S.C. 154(b) by 391 days.

(21) Appl. No.: 12/830,376

(22) Filed: Jul. 5, 2010

Related U.S. Application Data

(62) Division of application No. 11/627,152, filed on Jan. 25, 2007, now Pat. No. 7,751,620.

(51) Int. Cl.
*G06K 9/62* (2006.01)
*G06K 9/00* (2006.01)

(52) U.S. Cl. ........................................ 382/224; 382/168

(58) Field of Classification Search .................. 382/162, 382/164, 165, 167, 168, 173, 218–220; 358/1.9, 358/2.1, 515, 518, 520, 530; 345/83, 601, 345/603; 715/961
See application file for complete search history.

(56) References Cited

U.S. PATENT DOCUMENTS

| 4,721,951 A * | 1/1988 | Holler ........................... 345/603 |
| 5,254,978 A * | 10/1993 | Beretta .......................... 345/601 |
| 7,710,369 B2 * | 5/2010 | Dowling ......................... 345/83 |
| 8,150,155 B2 * | 4/2012 | El-Maleh et al. ............. 382/173 |

* cited by examiner

*Primary Examiner* — Amir Alavi
(74) *Attorney, Agent, or Firm* — Law Office of Andrei D Popovici, PC

(57) ABSTRACT

In some embodiments, image spam is identified by comparing color histograms of suspected spam images with color histograms of reference (known) images. The histogram comparison includes comparing a first color content in a query image with a range of similar color contents in the reference image. For example, a pixel count for a given color in the query image may be compared to pixel counts for a range of similar colors in the reference image. A histogram distance between two images may be determined according to a computed pixel count difference between the given query histogram color and a selected color in the range of similar reference histogram colors.

20 Claims, 7 Drawing Sheets

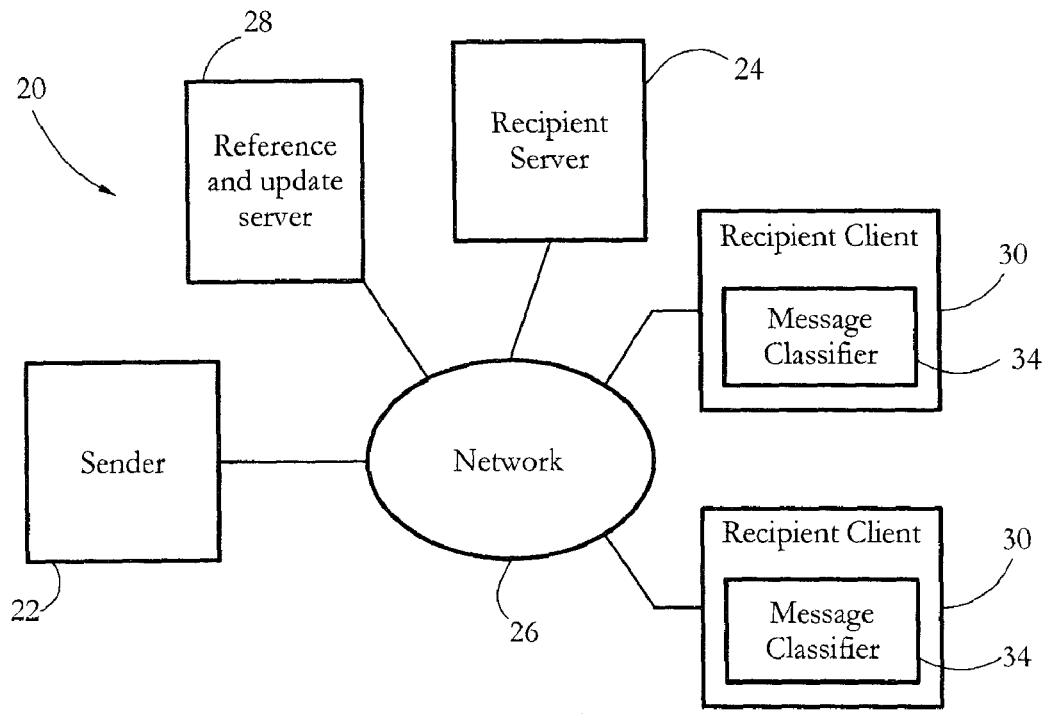
FIG. 1-A
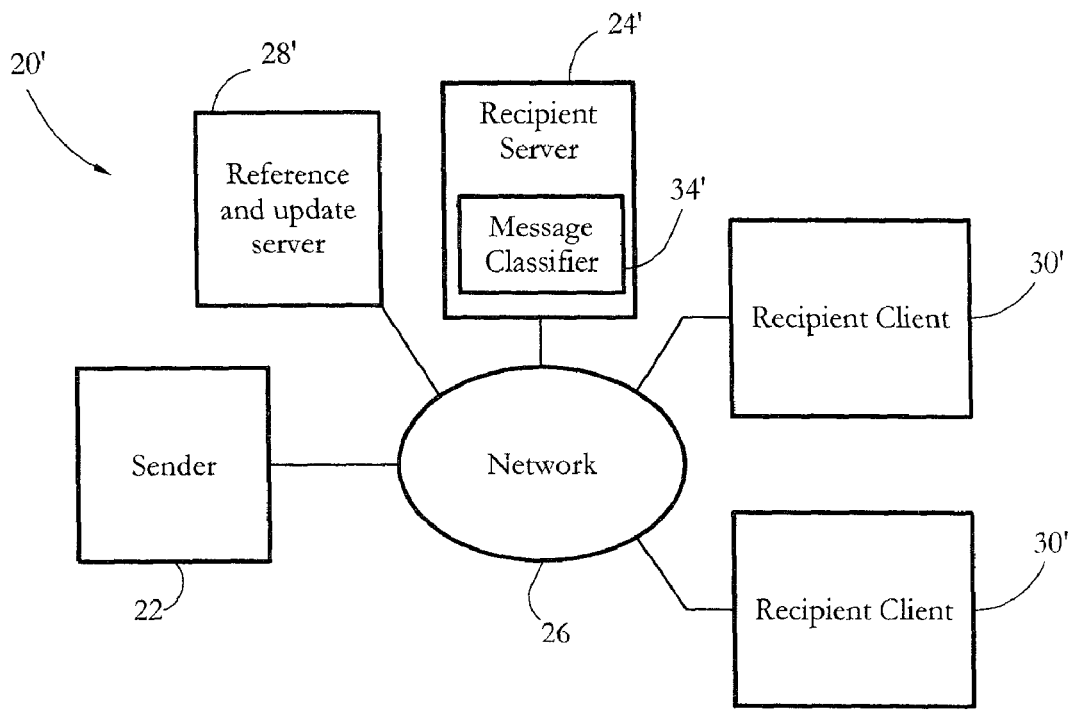
FIG. 1-B

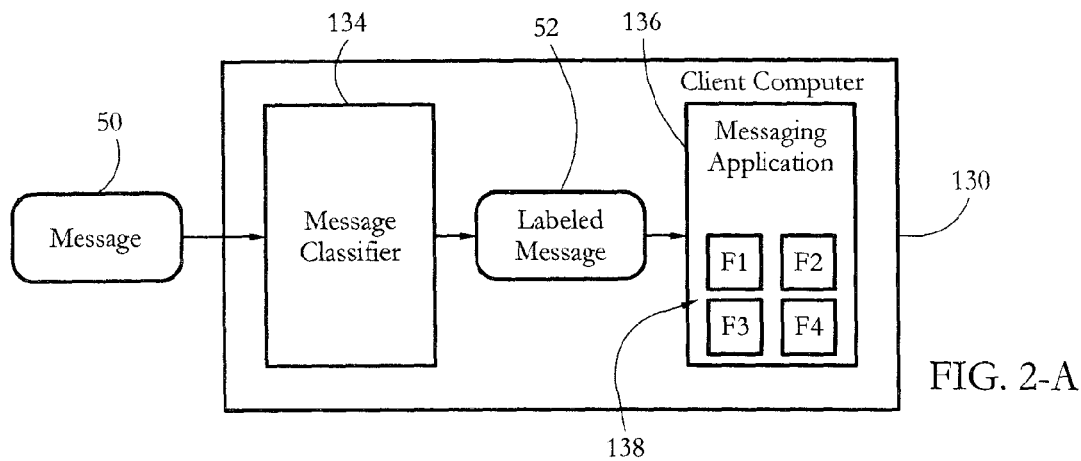
FIG. 2-A
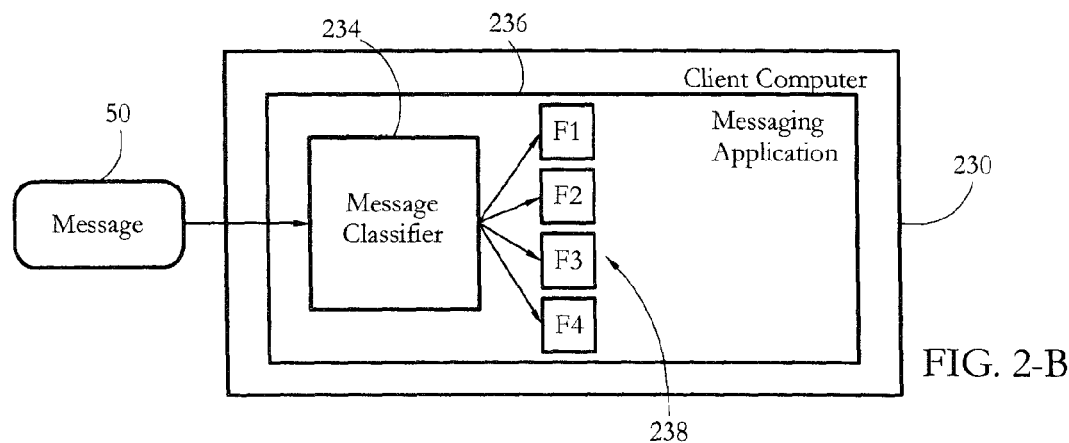
FIG. 2-B

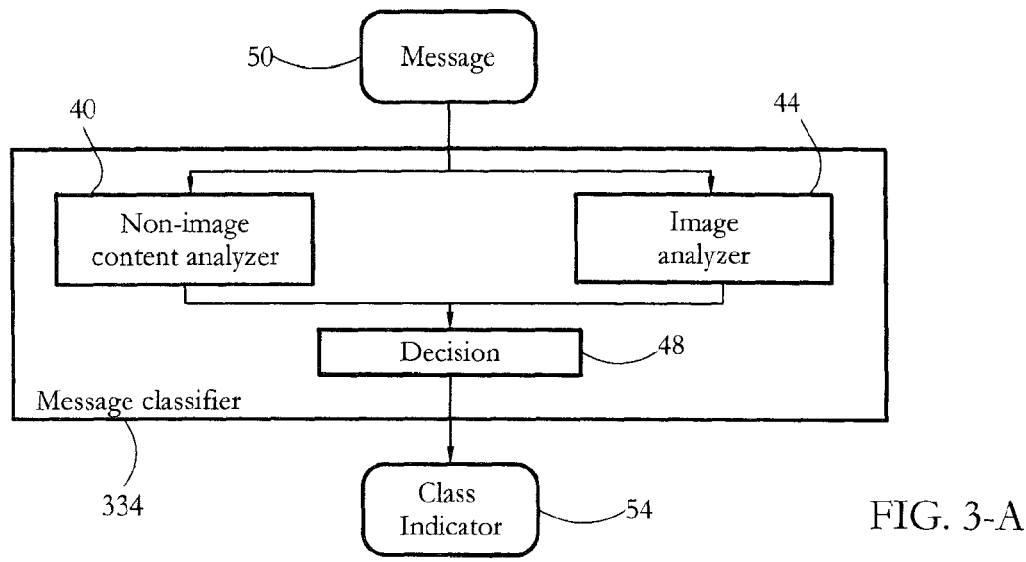
FIG. 3-A
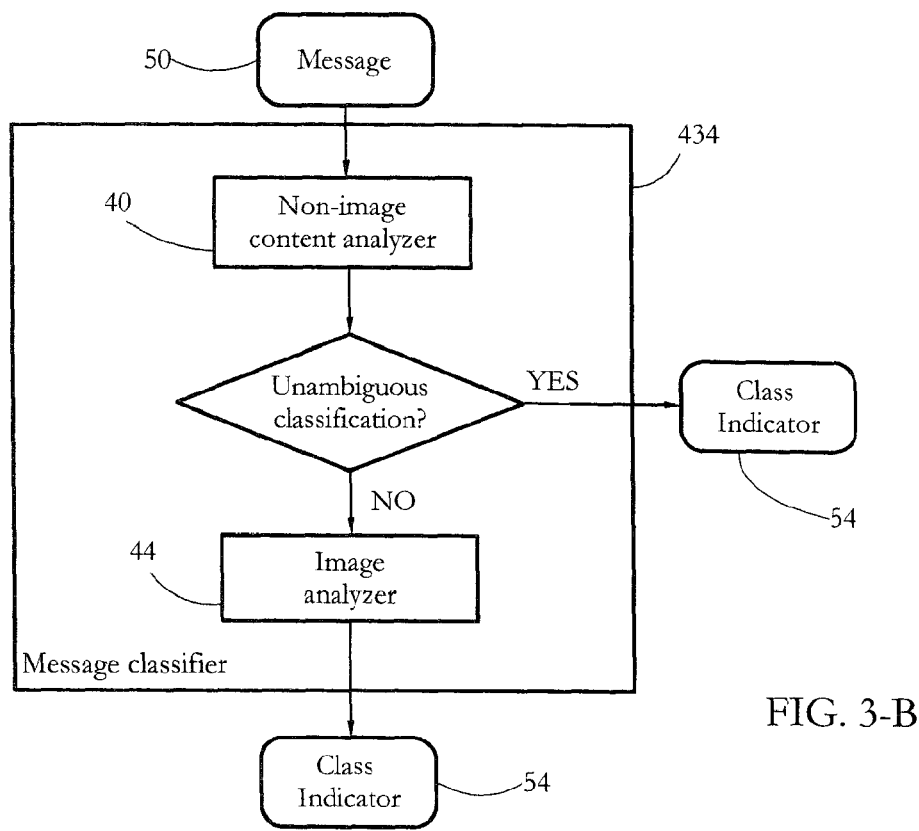
FIG. 3-B

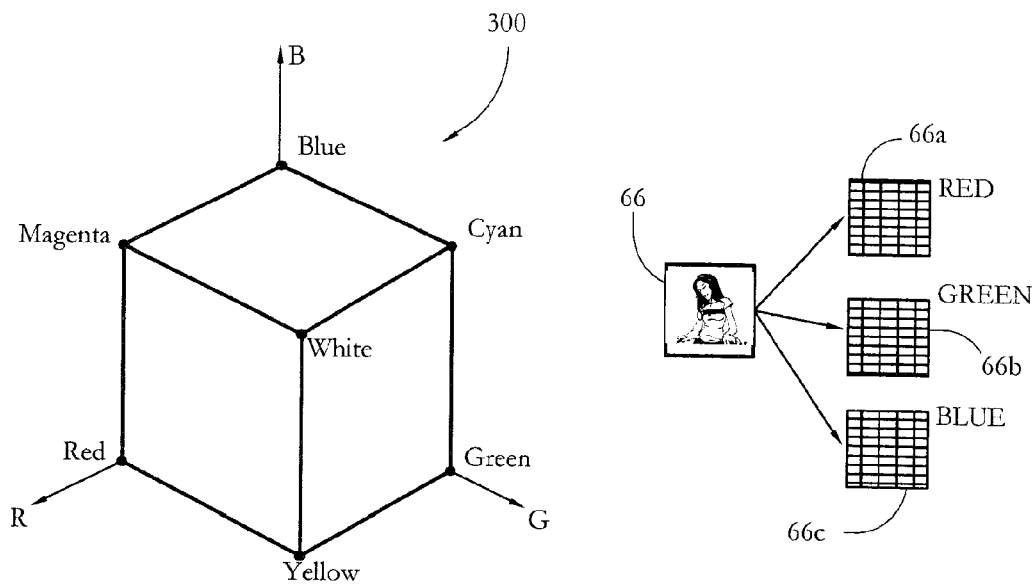
FIG. 6-A  FIG. 6-B
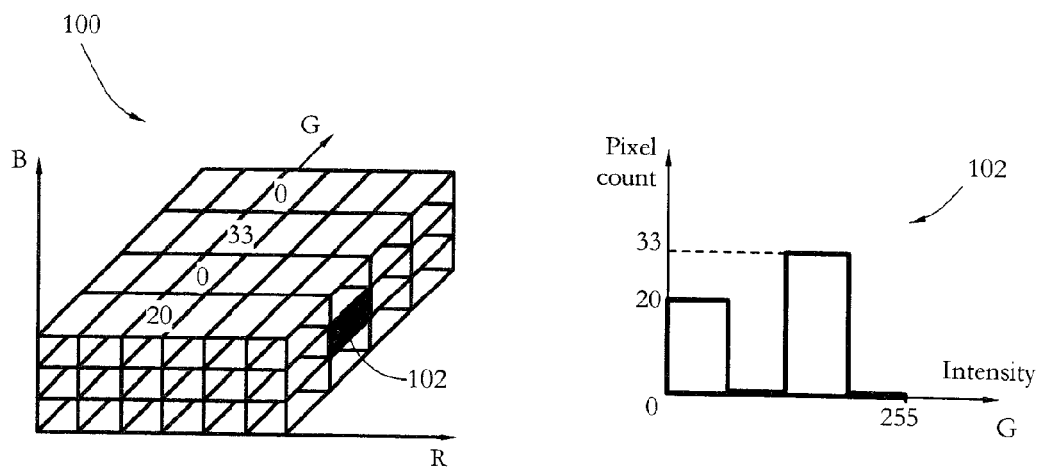
FIG. 7-A  FIG. 7-B

IMAGE FILTERING SYSTEMS AND METHODS

CROSS-REFERENCE TO RELATED APPLICATIONS

This application is a divisional of U.S. patent application Ser. No. 11/627,152 entitled "Image Spam Filtering Systems and Methods", filed Jan. 25, 2007, and scheduled to issue as U.S. Pat. No. 7,751,620 on Jul. 6, 2010. The entirety of the above-noted application is incorporated herein by reference.

BACKGROUND

The invention relates to systems and methods for classifying electronic communications, and in particular to systems and methods for filtering unsolicited commercial electronic mail (spam).

Unsolicited commercial electronic communications have been placing an increasing burden on the users and infrastructure of electronic mail (email), instant messaging, and phone text messaging systems. Unsolicited commercial email, commonly termed spam or junk email, forms a significant percentage of all email traffic worldwide. Spam takes up valuable network resources, affects office productivity, and is considered annoying and intrusive by many computer users.

Software running on an email user's or email service provider's system may be used to classify email messages as spam or non-spam. Spam messages can then be directed to a special folder or deleted. Several approaches have been proposed for identifying spam messages, including matching the message's originating address to lists of known offending or trusted addresses (techniques termed black- and white-listing, respectively), searching for certain words or word patterns (e.g., refinancing, Viagra®, weight loss), and analyzing message headers. Experienced spammers have developed countermeasures to such classification tools, such as misspelling certain words (e.g., Vlagra), and inserting unrelated text in spam messages.

A particular case of junk communication involves the transmission of digital images. These images may be offensive (e.g., adult content), or may be a form of conveying unsolicited information. Spammers try to avoid text-based detection by using digital images of words instead of actual text. One potential method of detecting such spam employs Optical Character Recognition (OCR) technology to convert images to text. Some OCR-based methods may be inaccurate and computationally expensive. To further complicate character recognition, spammers are known to use a range of so-called image obfuscation techniques, such as the addition of noise (random pixels), image distortion, interspersion of spam among sequences of animated image frames, and splitting individual images into multiple parts.

SUMMARY

According to one aspect, an electronic communication classification method comprises employing a computer system to perform the steps of: performing a subtraction operation between a pixel count of a first color in a first image and a pixel count of a second color in the second image, the first color being different from the second color, the first image and the second image being selected from a reference image and a query image, the first image being different from the second image; and classifying the query image according to a result of the subtraction operation.

According to another aspect, a non-transitory computer-readable storage medium encodes instructions which, when executed on a computer system, cause the computer system to perform the steps of: performing a subtraction operation between a pixel count of a first color in a first image and a pixel count of a second color in the second image, the first color being different from the second color, the first image and the second image being selected from a reference image and a query image, the first image being different from the second image; and classifying the query image according to a result of the subtraction operation.

According to one aspect, an electronic communication classification method comprises employing a computer system to perform the steps of: performing a plurality of comparisons between a pixel count of a first color in a first image and each of a plurality of pixel counts of the second image, the first image and the second image being selected from a reference image and a query image, the first image being different from the second image, the plurality of pixel counts of the second image representing pixel counts for a range of colors centered about the first color; and classifying the query image according to the plurality of comparisons.

According to another aspect, a non-transitory computer-readable storage medium encodes instructions which, when executed on a computer system, cause the computer system to perform the steps of: performing a plurality of comparisons between a pixel count of a first color in a first image and each of a plurality of pixel counts of the second image, the first image and the second image being selected from a reference image and a query image, the first image being different from the second image, the plurality of pixel counts of the second image representing pixel counts for a range of colors centered about the first color; and classifying the query image according to the plurality of comparisons.

BRIEF DESCRIPTION OF THE DRAWINGS

The foregoing aspects and advantages of the present invention will become better understood upon reading the following detailed description and upon reference to the drawings where:

FIG. 1-A shows an exemplary electronic communication system including multiple client computers each having a message classification subsystem (e.g. application) according to some embodiments of the present invention.

FIG. 1-B shows an exemplary electronic communication system including a mail server having a message classification subsystem capable of classifying messages sent to multiple clients, according to some embodiments of the present invention.

FIG. 2-A illustrates an exemplary classification subsystem distinct from an electronic mail application, according to some embodiments of the present invention.

FIG. 2-B illustrates an exemplary classification subsystem forming part of an electronic mail application, according to some embodiments of the present invention.

FIG. 3-A shows a high-level diagram of an electronic communication classifier in which non-image content and image content of a message are processed in parallel, according to some embodiments of the present invention.

FIG. 3-B shows a high-level diagram of an electronic communication classifier in which non-image content and image content of a message are processed in sequence, according to some embodiments of the present invention.

FIG. 6-A shows an exemplary representation of a digital image in an RGB color space according to some embodiments of the present invention.

FIG. 6-B illustrates an RGB color quantization space according to some embodiments of the present invention.

FIG. 7-A shows an exemplary structure of an image histogram computed in the RGB color space, according to some embodiments of the present invention.

FIG. 7-B illustrates an exemplary bar graph representation of a subset of the histogram of FIG. 7-A. according to some embodiments of the present invention.

DETAILED DESCRIPTION OF PREFERRED EMBODIMENTS

Figure 4:
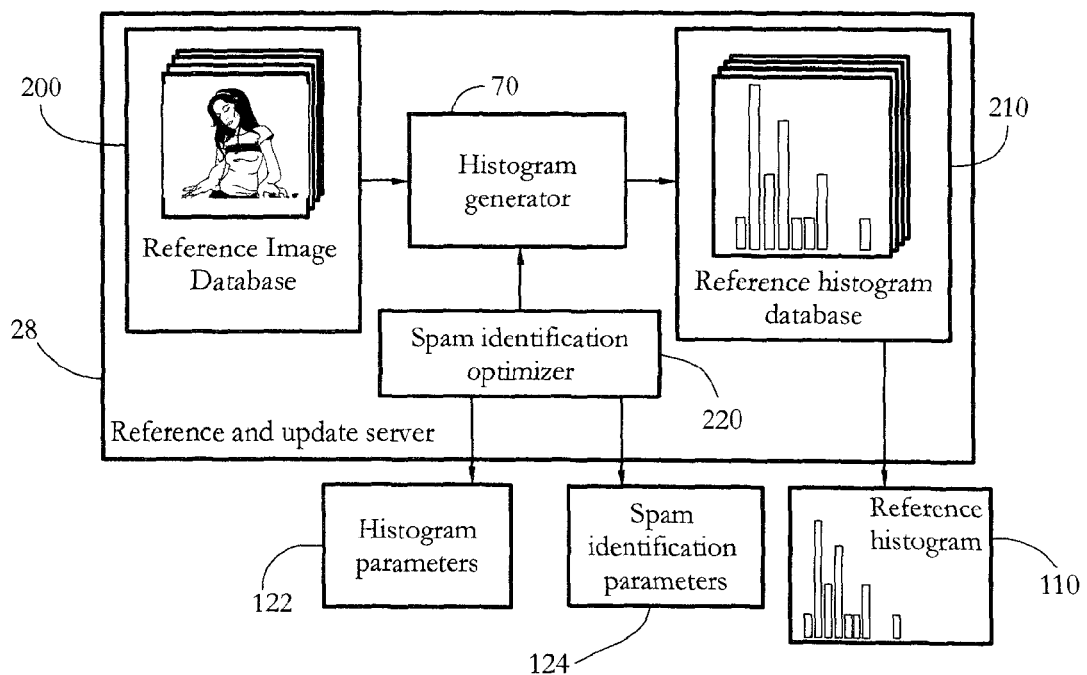
FIG. 4 shows an exemplary internal structure of a reference and update server of the systems of FIG. 1-A-B, according to some embodiments of the present invention.

In the following description, it is understood that all recited connections between structures can be direct operative connections or indirect operative connections through intermediary structures. A set of elements includes one or more elements. A plurality of elements includes two or more elements. Any recitation of an element is understood to refer to at least one element. Unless otherwise required, any described method steps need not be necessarily performed in a particular illustrated order. A first element (e.g. data) derived from a second element encompasses a first element equal to the second element, as well as a first element generated by processing the second element and optionally other data. Unless otherwise specified, the term "program" encompasses both stand-alone programs and software routines that form part of larger programs. Making a determination or decision according to a parameter encompasses making the determination or decision according to the parameter and optionally according to other data. Unless otherwise specified, the term histogram distance encompasses any histogram similarity measure, including measures which are close to zero for dissimilar histograms (i.e. depending on the histogram measurement scale used, a distance of zero may indicate non-matching, rather than identical histograms). Unless otherwise specified, an indicator of some quantity/data may be the quantity/data itself, or an indicator different from the quantity/data itself. Unless otherwise specified, the term spam is not limited to email spam, but encompasses non-legitimate or unsolicited commercial electronic communications such as email, instant messages, and phone text and multimedia messages, among others. Computer readable media encompass storage media such as magnetic, optic, and semiconductor media (e.g. hard drives, optical disks, flash memory, DRAM), as well as communications links such as conductive cables and fiber optic links.

The following description illustrates embodiments of the invention by way of example and not necessarily by way of limitation.

FIG. 1-A shows an electronic communication and classification system 20 according to some embodiments of the present invention. System 20 may be an electronic mail (email), instant messaging (IM), phone, or other electronic communication system. For clarity, the following discussion will focus in particular on an electronic email system. System 20 includes a sender computer system 22, a recipient server 24, a reference and update server 28, and a plurality of recipient client computer systems 30. Sender system 22 may include a sender mail server and/or one or more sender client computer systems. A network 26 connects sender system 22, recipient server 24, reference and update server 28, and recipient client systems 30. Network 26 may be a wide-area network such as the Interne, or a part of a telephone network. Parts of network 26, for example a part of network 26 interconnecting recipient client systems 30, may also include a local area network (LAN). Each recipient client system 30 includes a message classifier 34, which is used to classify electronic communications as described in detail below.

FIG. 1-B shows an electronic communication and classification system 20' according to some embodiments of the present invention. System 20' differs from the system 20 shown in FIG. 1-A in that a common message classifier 34' is provided on a recipient server 24'. Recipient client systems 30' receive pre-classified messages from recipient server 24', and do not include individual classification programs.

An email message sent by sender system 22 to one or more email addresses is received at recipient server 24, and then sent or made available otherwise (e.g. through a web interface) to recipient client systems 30, 30'. The message is classified into one of a plurality of classes by message classifiers 34, 34'. In some embodiments, the classes include one or more classes of unsolicited commercial email (spam), and one or more classes of non-spam (legitimate or unknown) email. In a simple embodiment, defined classes may include spam, legitimate, and unknown/undetermined. In some embodiments, classes of legitimate email may include personal and work, while spam classes may include product offers and phishing, among others. In the configuration of FIG. 1-A, the message classification is performed individually on each client computer 30. In the configuration of FIG. 1-B, the message classification may be performed for multiple clients by server subsystem 24'.

FIG. 2-A shows an exemplary recipient client computer system 130 including a message classifier 134 separate from a messaging application 136, according to some embodiments of the present invention. In some embodiments, message classifier 134 may be a stand-alone application, or may be an antispam module of a security suite having antivirus, firewall, and other modules. Message classifier 134 receives an email message 50, and transfers a labeled (classified) message 52 to messaging application 136. In a telephone messaging embodiment, message 50 may be a multimedia message such as a multimedia messaging service (MMS) message. The labeled message may include a classification label, which may be placed in a header field of labeled message 52. In some embodiments, message classifier 134 may transfer to messaging application 136 a classification label and an indicator of an association of the label to message 50. Messaging application 136 places labeled message 52 in one of a plurality of folders 138 (labeled F1-F4 in FIG. 2-A) according to the classification label. Folders 138 may include one or more spam folders and one or more non-spam folders. A user may interact with classification engine 134 and/or messaging application 136 to manually alter the classification of given messages.

FIG. 2-B shows an exemplary recipient client computer system 230 including a classification engine 234 integrated in a messaging application 236. A message 50 received by classification engine 234 is directed to one of a plurality of folders 238 directly by classification engine 234 or by other routines of messaging application 236. Folders 238 may include one or more spam folders and one or more non-spam folders. A user may interact with messaging application 236 to manually alter the classification of given messages, for example by moving the messages from one folder to another.

FIG. 3-A shows a diagram of a message classifier 334 according to some embodiments of the present invention. Message classifier 334 includes a non-image content analyzer 40, an image analyzer 44, and a composite decision module 48 connected to non-image content analyzer 40 and image analyzer 44. Within message classifier 334, operation of analysis modules 40 and 44 is carried out in parallel. Analysis modules 40 and 44 receive a message 50, analyze non-image and image content of message 50, and generate corresponding class indicators. Analyzing the non-image content of message 50 may include header processing (e.g., identifying the sender address as a permitted or non-permitted address), word/semantic analysis (e.g., detection of certain known keywords or phrases commonly associated with spam), and analysis of other non-image message characteristics. The operation of image analyzer 44 is described in detail below. Composite decision module 48 receives specific aspect indicators from analysis modules 40 and 44 and generates a class indicator 54. In some embodiments, class indicator 54 and aspect indicators generated by analysis modules 40, 44 may include numerical scores and/or binary (yes/no) values.

FIG. 3-B shows a diagram of a message classifier 434 according to some embodiments of the present invention. In this operational version, non-image content analyzer 40 and image analyzer 44 work sequentially. The processed message 50 first undergoes non-image content analysis. If the analysis yields a non-ambiguous message classification, message classifier 434 outputs class indicator 54 and exits. In case the non-image content analysis 40 does not provide a definitive class assignment, message 50 is passed on to the image analyzer 44, which further processes the content to produce class indicator 54.

FIG. 4 shows a diagram of reference and update server 28 according to some embodiments of the present invention. Reference and update server 28 hosts a reference image database 200 and a spam identification optimizer 220. In some embodiments, reference and update server 28 further includes a reference histogram database 210 and a histogram generator 70. In some embodiments, the reference image database 200 includes a collection of images associated with unsolicited communications. In some embodiments, the reference image database 200 includes multiple images, pre-classified as members of several classes/subclasses (e.g., spam, adult content, etc.). Reference image database 200 may be kept up to date by the addition of newly discovered image spam. Histogram generator 70 processes each image from the reference image database 200 and produces a corresponding image histogram. Histograms corresponding to images in the reference image database are stored in reference histogram database 210. In some embodiments, reference histogram database is sorted and indexed to reflect multiple subclasses of images. The reference and update server 28 makes reference histograms 110 available to message classifiers 34, 34', residing on recipient clients 30 or recipient server 24. In some embodiments, the contents of reference histogram database 210 may be downloaded by clients via periodic or on-demand software updates over network 26.

Spam identification optimizer 220 specifies the classification algorithms and operational parameters of message classifiers 34, 34'. In some embodiments, spam identification optimizer 220 defines a set of histogram parameters 122 and a set of spam identification parameters 124. Histogram parameters 122 may include the number, size, and position of histogram bins, as well as values for parameters $\Delta$ and $\delta$ used by subsystems of message classifiers 34,34' as described in detail below. Spam identification parameters 124 may also include a set of thresholds T, to be used by subsystems of message classifiers 34, 34' as described in detail below. Histogram parameters 122 and/or spam identification parameters 124 may be optimized and kept up to date to reflect the ever-changing nature of spam attacks. In some embodiments, parameters 122 and 124 may be downloaded by clients via periodic or on-demand software updates over network 26.

Figure 5:
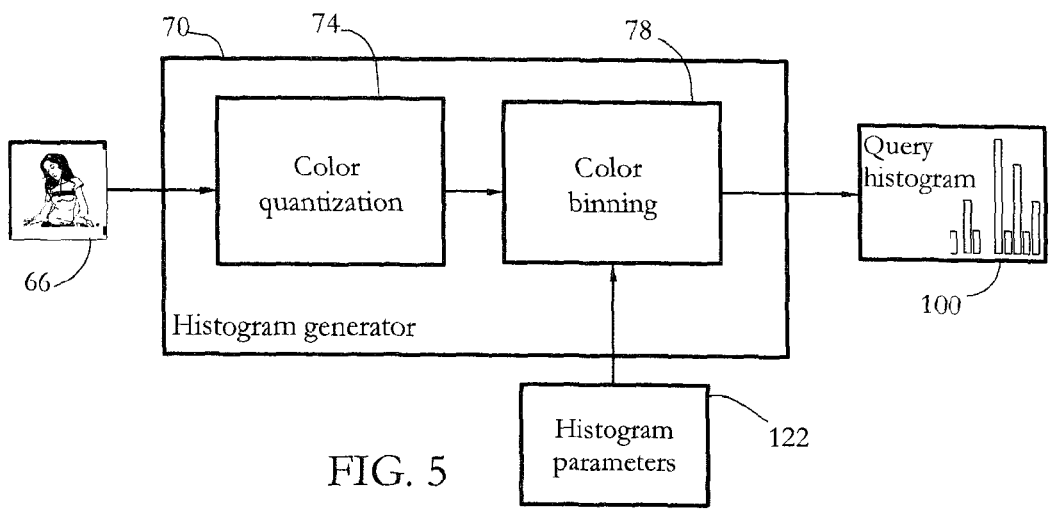
FIG. 5 shows an internal structure of a histogram generator according to some embodiments of the present invention.

FIG. 5 shows a diagram of histogram generator 70 according to some embodiments of the present invention. Histogram generator 70 inputs a digital image 66 and histogram parameters 122, and outputs a query (target) histogram 100 representing image 66. Histogram generator 70 includes a color quantization module 74 and a color binning module 78. Color quantization module 74 inputs image 66 and outputs a table of integers forming a representation of image 66 in a given color space. A color space 300 forms a model for representing color in terms of a set of color basis values. In some embodiments, color quantization module 74 uses the Red-Green-Blue (RGB) color space. Some embodiments of color quantization module 74 may use a Hue-Saturation-Value (HSV), Luminance-Chrominance (YUB, YCrCb), or other quantized color space.

FIG. 6-A is an illustration of an RGB space 300 showing the position of a few common colors (e.g., green, magenta, cyan). The color of a given pixel within image 66 corresponds to a point within space 300. FIG. 6-B shows an illustrative example of the three associated basis color representations 66a-c of image 66. The basis color representations 66a-c may be tables of integers giving the intensity (amount) of the corresponding basis color at every pixel.

Color binning module 78 (FIG. 5) generates a histogram of the analyzed image 66 in a given color space, taking the histogram parameters 122 as additional input. FIG. 7-A shows an illustrative representation of a query or reference histogram 100 according to some embodiments of the present invention. Histogram 100 is a representation of the frequency distribution of the various colors in image 66. In some embodiments, generating histogram 100 involves partitioning color space 300 into a set of individual bins 102, and counting how many pixels of image 66 have intensity values that fall within the range of each bin. Illustratively, in a three-dimensional color space such as the RGB space, each bin 102 is a cuboid. A two-dimensional graphical representation of histogram 100 may be obtained by slicing the histogram by planes, perpendicular to two distinct coordinates (basis colors), and plotting the pixel count versus color intensity of the remaining basis color, in the form of a bar graph. FIG. 7-B shows a simple illustration of such a bar graph for an exemplary color (e.g. green). In some embodiments, the number, position, and size (intensity range) of histogram bins 102 are included in the histogram parameters 122.

Figure 8:
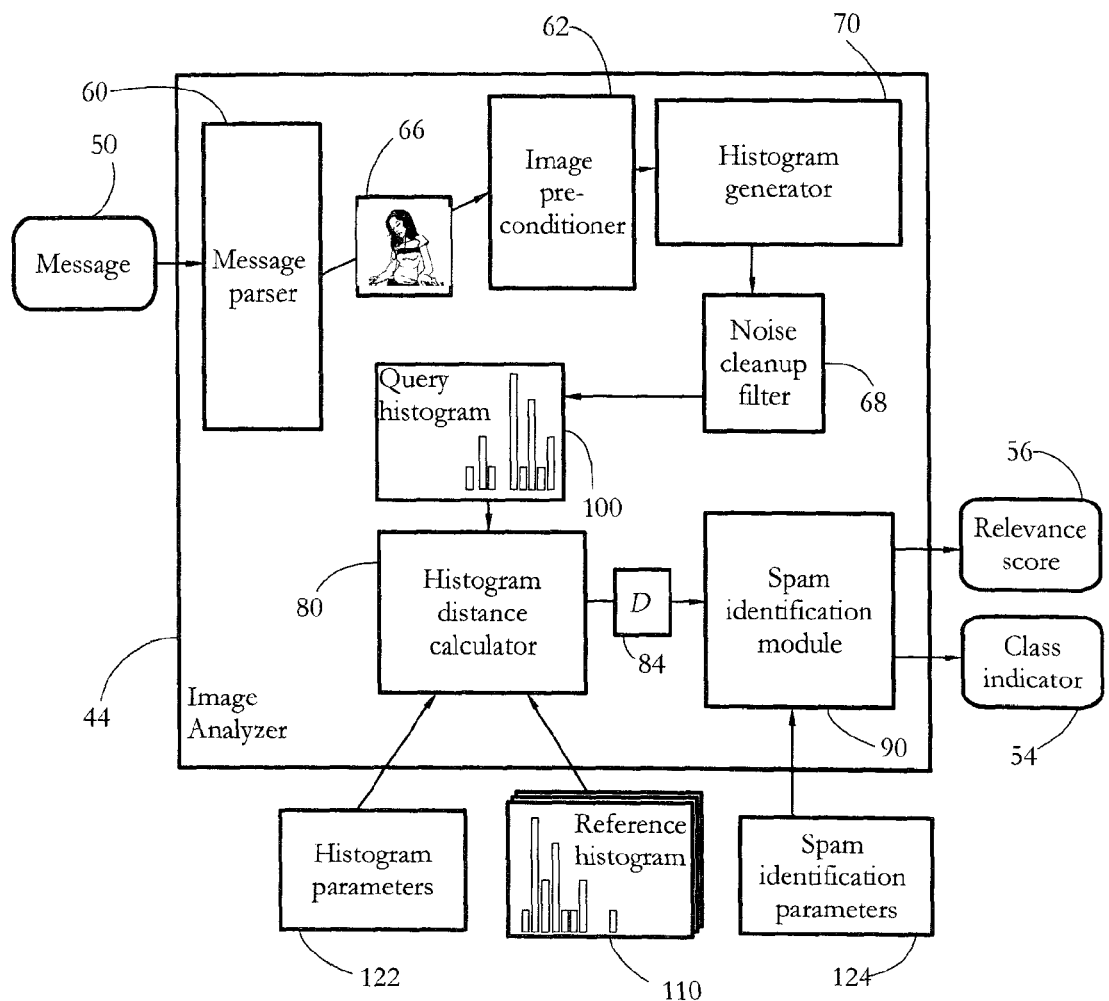
FIG. 8 shows an internal structure of an image analyzer of the system in FIG. 3-A-B, according to some embodiments of the present invention.

FIG. 8 shows an internal structure of image analyzer 44 according to some embodiments of the present invention. Image analyzer 44 includes a message parser 60, a histogram generator 70, a histogram distance calculator 80, and a spam identification module 90. In some embodiments, image analyzer 44 further includes an image pre-conditioner 62 connected to the message parser 60 and histogram generator 70, and a noise cleanup filter 68 connected to histogram generator 70 and histogram distance calculator 80. Image analyzer 44 inputs the message 50 and a set of reference histograms 110, together with histogram parameters 122 and spam identification parameters 124, and outputs a message class indicator 54 and/or class relevance score 56. In some embodiments, image analyzer 44 compares the image content of the incoming message 50 against a multitude of reference histogram sets, each set representing a collection of reference images pertaining to a particular class/subclass of messages (e.g., spam, adult content, etc.).

Message parser 60 inputs the incoming message 50, strips away any header, text, and other non-image message content, and outputs the image 66 embedded or attached to message 50, if such an image exists. Image pre-conditioner 62 processes image 66 and outputs a modified version of image 66 to histogram generator 70. A pre-conditioning process may serve to counteract spam obfuscation attempts by, for example, reducing the effect of random noise addition to an image. In some embodiments, image pre-conditioner 62 may use image de-noising algorithms, including a median filter, wavelet filter, Fourier filter, entropy-reducing filter, or a combination thereof.

Histogram generator 70 inputs image 66 and outputs a query histogram associated to image 66. The operation of histogram generator 70 may be identical to the one described above in the context of reference server 28. Noise cleanup filter 68 receives the query histogram generated by histogram generator 70 and outputs a modified version of the query histogram, shown in FIG. 8 at 100. In some embodiments, noise cleanup filter 68 may return a truncated version of the query histogram, which retains the information from bins whose pixel count exceeds a pre-set threshold γ, and sets the pixel count of all other bins to zero. The employed pixel count may be an absolute pixel count (e.g. an absolute number of pixels in the bin), or a relative pixel count (e.g. a number of pixels in the bin as a fraction of the total number of pixels in the image). In some embodiments, for every bin of the query histogram with original pixel count $h_i$, noise cleanup filter 68 may return a modified pixel count $h_i'$, such $$\text{that } h_i' = \begin{cases} h_i, & \text{if } \frac{h_i}{\sum_{\text{all bins } i} h_i} > \gamma \\ 0, & \text{otherwise} \end{cases}.$$

In some embodiments, the threshold value γ may be computed by the spam identification optimizer 220. Suitable values for the threshold may be determined experimentally and/or using Receiver Operator Curve (ROC) analysis to optimize the sensitivity and/or specificity of spam identification. The threshold may be chosen to arrive at a desired ratio of false positives to false negatives. Some embodiments of noise cleanup filter 68 may use a value γ between 0.0001 and 0.01, for example about 0.001. If the threshold is set to 0.001, then colors which contribute less than 0.1% of the pixels in the image are effectively eliminated from the image histogram, while colors which contribute more than 0.1% of the pixels in the image are kept. Eliminating colors having only minor contributions allows reducing the effects of random pixels or lines sometimes used by spammers to make spam detection more difficult.

Histogram distance calculator 80 inputs query histogram 100, a set of reference histograms 110, and histogram parameters 122, and outputs a set of histogram distances 84 to the spam identification module 90. In some embodiments, a histogram distance D is computed according to a formula:

$$D(h, g) = \frac{\left| \sum_A \sum_B \sum_C \min(h(a, b, c), g(a \pm \delta, b \pm \delta, c \pm \delta)) \right|_{\frac{|h(a,b,c) - g(a \pm \delta, b \pm \delta, c \pm \delta)|}{\max(|h(a,b,c)|, |g(a \pm \delta, b \pm \delta, c \pm \delta)|)} \le \Delta}}{\min(|h|, |g|)}, \quad [1]$$

wherein h and g denote pixel counts of the query and reference histograms, respectively, a coordinate triplet (a, b, c) tags an individual color bin, A, B and C denote the basis colors of the color space, parameters δ and Δ denote a color neighborhood size and a color bin similarity threshold, respectively, while |h| and |g| denote the magnitude (i.e., total number of samples) of the query and reference histograms, respectively. The distance of eq. [1] is symmetrical with respect to h and g—i.e. the distance depends on the contents of the two images, but not on which of the two images is a query histogram and which is a reference histogram. In some embodiments, eq. [1] may be used with h and g denoting pixel counts of the reference and query histograms, respectively. A histogram distance may also be defined as 1−D(h,g), where D(h,g) is given by eq. [1]. If D(h,g) is given by eq. [1], then a value of D(h,g) close to one indicates an image match, while a value close to zero indicates no match.

Figure 9:
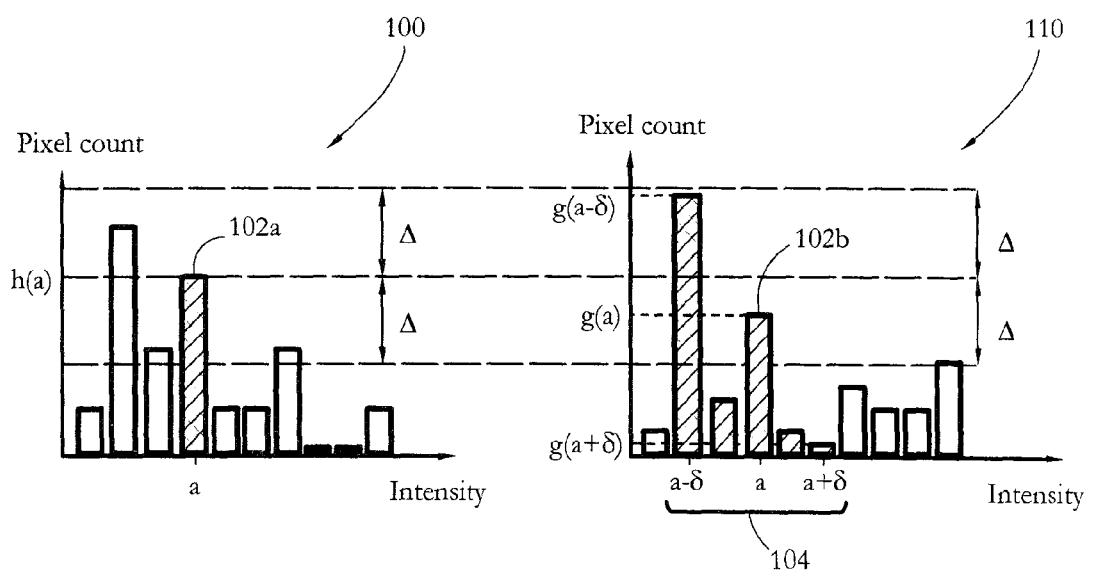
FIG. 9 illustrates an exemplary calculation of a distance between two image histograms according to some embodiments of the present invention.

Eq. [1] may be better understood with reference to FIG. 9, which shows a pair of simplified query and reference histograms according to some embodiments of the present invention. For clarity, a query histogram 100 and reference histogram 110 are depicted in two dimensions, wherein a indexes the color bins 102*a-b* of the query and reference histogram, respectively, while h(a) and g(a) denote the pixel counts (number of pixels in bin a) of the query and reference histogram, respectively. The pixel count h(a) of a bin 102*a* of the query histogram 100 is compared to the pixel count g(a±δ) of a range of bins 104 of the reference histogram 110, wherein the range 104 is centered upon bin 102*b*, located at the same position a in color space as bin 102*a*, and the range 104 includes all neighboring bins of bin 102*b* up to a distance δ away in all directions of the color space. Next, the bins in range 104 whose pixel count differs from h(a) by not more than bin similarity threshold Δ are selected, and D is incremented by a value representing the smallest number between h(a) and the pixel counts of the selected bins. For example, in FIG. 9, only g(a) and g(a−δ) are within Δ from h(a). The value g(a) is the smallest of the values h(a), g(a), and g(a−δ), so the contribution to D is g(a)/min(|h|, |g|). If none of the bins in range 104 have a pixel count within Δ from h(a), the current bin a does not contribute to D. The operation is repeated for every bin 102*a* of query histogram 100. The resulting histogram distance D is close to 1 if the query histogram 100 and reference histogram 110 have matching color content, and close to 0 if the histograms have few or no matching color bins.

In some embodiments, the reference histogram color bins are sorted by pixel count prior to calculating histogram distances according to eq. [1]. Such pre-sorting may facilitate determining the smallest bin in a range of reference histogram bins. Consider for example a query histogram color bin (a,b,c), and a reference histogram for which only the colors (a−2, b, c+1) and (a,b+3,c) in a color range (a±4,b±4,c±4) meet the bin similarity condition (the right hand-term) of eq. [1]. If the reference bins are pre-sorted, selecting the minimum-pixel bin between the bins (a−2, b, c+1) and (a,b+3,c) may be done by identifying which of the two bins has the smallest (or largest, depending on sorting order) sorting index. Then the pixel count of the selected reference histogram bin is compared to the pixel count of the color bin (a,b,c), and the minimum term is added to the sum of eq. [1].

Some embodiments of histogram distance calculator 80 may use a histogram distance such as $$D'(h, g) = \frac{\left|\sum_A \sum_B \sum_C \min(h(a, b, c), g(a \pm \delta_1, b \pm \delta_2, c \pm \delta_3))\right|}{\min(|h|, |g|)}, \quad \frac{|h(a, b, c) - g(a \pm \delta_1, b \pm \delta_2, c \pm \delta_3)|}{\max(|h(a, b, c)|, |g(a \pm \delta_1, b \pm \delta_2, c \pm \delta_3)|)} \leq \Lambda$$ [2]

which differs from eq. [1] in that it uses different color neighborhood sizes $\delta_1$, $\delta_2$, $\delta_3$ in the three directions of the color space. In some embodiments, the max and/or min term in eqs. [1] and/or [2] may also be replaced with a minimum, maximum, an average, or another normalization measure indicative of the magnitudes of h and g.

In some embodiments, the sum forming the left side and/or denominator of eqs. [1] and/or [2] may be replaced with a sum of contributing colors normalized by a total number of matching colors, rather than a total number of pixels. For example, if there are 100 defined colors and histogram distances (or similarities) are measured on a scale of 1-1000, then every color match (determined for example as described above with reference to eq. [1]) may be used to increment the histogram distance/similarity by 10 (the fractional contribution of the matching color to the set of available colors), rather than by a normalized pixel count.

In some embodiments, the values of color neighborhood size δ and bin similarity threshold Δ may be computed by the spam identification optimizer 220. Suitable values may be chosen experimentally and/or using Receiver Operator Curve (ROC) analysis to optimize the sensitivity and/or specificity of spam identification. The color neighborhood size δ and bin similarity threshold Δ may be chosen to arrive at a desired ratio of false positives to false negatives. Exemplary values for δ and Δ may be between 1 and 20, for example about 10 for δ, and between 0.0001 and 0.01, for example about 0.001 for Δ. If the bin similarity threshold Δ is set to 0.001, then two color bins are considered to match if the pixel number difference between the two bins is less than or equal to 0.1% of the larger of the two bins. If the color neighborhood size δ is set to 10, the range of neighboring colors evaluated for each given bin is 10 color values in each direction on a 0-255 scale.

In some embodiments, a histogram distance 84 may be computed as a Euclidean distance $$D_E(h, g) = \sum_A \sum_B \sum_C [h(a, b, c) - g(a, b, c)]^2,$$

or as an intersection distance, $$D_I = \frac{\sum_A \sum_B \sum_C \min[h(a, b, c), g(a, b, c)]}{\min(|h|, |g|)},$$

or as a cross-distance $D_C = (h-g)^t A(h-g)$, where the superscript t denotes matrix transposition and A is a matrix whose elements are $$a_{ij} = 1 - \frac{d_{ij}}{\max(d_{ij})},$$

while $d_{ij}$ is the distance in color space between color bins i and j. Such distances generally compare identical colors in the query and reference histograms, and thus may not be as effective as the distances of eqs. [1] and [2] in accurately handling obfuscation measures used by spammers. Empirically, such distances were found to yield relatively large numbers of false positives and false negatives, in part because such distances may not adequately handle image noise. For example, noise in the query image may lead to false matches to reference images, while small changes in query image colors may lead to false negative determinations.

Spam identification module 90 (FIG. 8) inputs a set of histogram distances 84 and spam identification parameters 124, and outputs message class indicator 54 and/or class relevance score 56. In some embodiments, spam identification module 90 may compare the histogram distances 84 returned by the histogram distance calculator 80, which represent the degree of similarity between the current image 66 and a set of images from the reference image database 200, to a pre-set threshold T. For example, if any of the distances D given by formula [1] is larger than the threshold T, the current image may be considered similar to an already existing reference image, and therefore the incoming message 50 may be marked as spam. In some embodiments, threshold values T may be computed by the spam identification optimizer 220 and may be included in the spam identification parameters 124. In some embodiments, the threshold T may be set to be between 700 and 900 on a scale of 0-1000, for example about 800. For two histograms having ten color bins each, a histogram distance of 800 corresponds roughly to a finding that eight out of the ten colors can be found in both images/histograms in roughly the same quantity. The threshold value T may be used to fine-tune a filter's aggressiveness: a smaller T value will yield a histogram match upon matching a small number of image colors; while a larger T will require a higher degree of color similarity between two histograms to find an image match. In some embodiments, an end user may select one of a predetermined number of T values by selecting a desired level of filter aggressiveness.

The exemplary systems and methods described above allow a message classification system such as an anti-spam filter to classify new email messages according to their image content. Message similarity and degree of membership to a particular class of messages may be evaluated according to the distance between image histograms, for which the proposed anti-spam filter may use an externally-classified email corpus as a reference.

The following description is intended to illustrate aspects of particular implementations of embodiments of the present invention, and is not intended to limit the scope of the present invention. A number of spam filtering tests were run on an exemplary spam email corpus to evaluate the effect of tailoring a number of internal parameters on spam detection sensitivity. The tests were performed substantially as described above, with the histogram distance given by eq. [1]. The tests did not use an image pre-conditioner such as the one shown in FIG. 8. The tests employed an email corpus consisting of two million real spam messages, containing 200 distinct images with varying noise levels. The overall detection rate was 98.7%, while the false positive rate was 0.07%.

Employing histograms distances as described above provide a relatively sensitive, specific, and computationally inexpensive way of identifying spam. Image analysis based on histograms or other color comparison, rather than optical character recognition, may be relatively computationally inexpensive. Histogram analysis may be relatively insensitive to some image transformations, such as image rotation and resizing. Furthermore, determining histogram distances by comparing similar colors and not just identical colors in the query and references images addresses obfuscation approaches used by spammers. In general, common obfuscation strategies may include: adding random pixels or noise to existing images; image resizing; inserting bogus frames in animated frame sequences; adding borders or colored lines/areas to existing images; splitting the original image into parts and re-composing it for the viewer using table commands (e.g., HTML). The exemplary methods and systems described above may address these strategies. The effect of random pixels, borders, and noise may be reduced by using image-preconditioning and histogram noise cleaning, as described above. Image resizing need not change the image histograms. Various heuristics may be used to detect bogus frames in an animated sequence, so spam frames can be targeted separately; if an image is split into parts, the histograms of the individual parts may be concatenated to re-compose the histogram of the full image, so detection may proceed as it would with a normal image.

A classification filter as described above may also evolve over time, as relevant features of image spam change. The exemplary systems and methods described above allow a continuous update and optimization of spam detection, by modifications in the process parameters. For example, parameters δ and γ, as well as thresholds Δ and T, may change to accommodate new obfuscation techniques. Furthermore, the reference image database of spam/offensive content may be kept up to date by constantly including newly detected items.

It will be clear to one skilled in the art that the above embodiments may be altered in many ways without departing from the scope of the invention. Accordingly, the scope of the invention should be determined by the following claims and their legal equivalents.

What is claimed is:

1. An image classification method comprising employing a computer system comprising at least one processor to perform the steps of:
performing a plurality of subtraction operations between a pixel count of a first color in a first image and a corresponding plurality of pixel counts in the second image, the plurality of pixel counts in the second image representing pixel counts for a range of colors centered about the first color, the first image and the second image being selected from a reference image and a query image, the first image being different from the second image; and
classifying the query image according to a plurality of results of the plurality of subtraction operations.

2. The method of claim 1, further comprising determining whether an electronic communication comprising the query image is spam or non-spam according to a result of classifying the query image.

3. The method of claim 2, wherein the electronic communication comprises an electronic mail message.

4. The method of claim 1, wherein the range of colors is determined by three ranges of basis color contents centered substantially about a vector defined by three basis color contents of the first color.

5. The method of claim 1, further comprising determining an image distance between the first and second images according to the plurality of results of the plurality of subtraction operations, and determining whether the electronic communication is spam or non-spam according to the distance.

6. The method of claim 5, wherein determining the distance comprises comparing the plurality of results of the plurality of the subtraction operations to a color bin similarity threshold.

7. The method of claim 5, wherein determining the distance comprises determining a distance indicator D(h,g) substantially according to $$D(h, g) = \frac{\sum_A \sum_B \sum_C \min(h(a, b, c), g(a \pm \delta, b \pm \delta, c \pm \delta)) \left| \frac{|h(a,b,c) - g(a \pm \delta, b \pm \delta, c \pm \delta)|}{\max(|h(a,b,c)|, |g(a \pm \delta, b \pm \delta, c \pm \delta)|)} \leq \Delta \right|}{\min(|h|, |g|)},$$

wherein h and g denote histogram representations selected from a query histogram representation of the query image and a reference histogram representation of the reference image, g being distinct from h, wherein a, b, and c are basis colors, wherein δ is a basis color evaluation range, and wherein Δ is a bin similarity threshold.

8. The method of claim 1, further comprising performing an identical-color subtraction operation between the pixel count of the first color in the first image and a pixel count of the first color in the second image, and classifying the query image according to a result of the identical-color subtraction operation.

9. A non-transitory computer-readable storage medium encoding instructions which, when executed on a computer system, cause the computer system to perform the steps of:
performing a plurality of subtraction operations between a pixel count of a first color in a first image and a corresponding plurality of pixel counts in the second image, the plurality of pixel counts in the second image representing pixel counts for a range of colors centered about the first color, the first image and the second image being selected from a reference image and a query image, the first image being different from the second image; and
classifying the query image according to a plurality of results of the plurality of subtraction operations.

10. The storage medium of claim 9, wherein the instructions further cause the computer system to determine whether an electronic communication comprising the query image is spam or non-spam according to a result of classifying the query image.

11. The storage medium of claim 10, wherein the electronic communication comprises an electronic mail message.

12. The storage medium of claim 10, wherein the range of colors is determined by three ranges of basis color contents centered substantially about a vector defined by three basis color contents of the first color.

13. The storage medium of claim 9, wherein the instructions further cause the computer system to determine an image distance between the first and second images according to the plurality of results of the plurality of subtraction operations, and determining whether the electronic communication is spam or non-spam according to the distance.

14. The storage medium of claim 13, wherein determining the distance comprises comparing the plurality of results of the plurality of subtraction operations to a color bin similarity threshold.

15. The storage medium of claim 13, wherein determining the distance comprises determining a distance indicator D(h, g) substantially according to $$D(h, g) = \frac{\left|\sum_A \sum_B \sum_C \min(h(a, b, c), g(a \pm \delta, b \pm \delta, c \pm \delta))\right|}{\min(|h|, |g|)}\Bigg|_{\frac{|h(a, b, c) - g(a \pm \delta, b \pm \delta, c \pm \delta)|}{\max(|h(a, b, c)|, |g(a \pm \delta, b \pm \delta, c \pm \delta)|)} \leq \Delta},$$

wherein h and g denote histogram representations selected from a query histogram representation the query image and a reference histogram representation the reference image, g being distinct from h, wherein a, b, and c are basis colors, wherein δ is a basis color evaluation range, and wherein Δ is a bin similarity threshold.

16. The storage medium of claim 9, wherein the instructions further cause the computer system to perform an identical-color subtraction operation between the pixel count of the first color in the first image and a pixel count of the first color in the second image, and to classify the query image according to a result of the identical-color subtraction operation.

17. An image classification method comprising employing a computer system comprising at least one processor to perform the steps of:
performing a plurality of comparisons between a pixel count of a first color in a first image and each of a plurality of pixel counts of the second image, the first image and the second image being selected from a reference image and a query image, the first image being different from the second image, the plurality of pixel counts of the second image representing pixel counts for a range of colors centered about the first color; and
classifying the query image according to the plurality of comparisons.

18. The method of claim 17, further comprising determining whether an electronic communication comprising the query image is spam or non-spam according to a result of classifying the query image.

19. A non-transitory computer-readable storage medium encoding instructions which, when executed on a computer system, cause the computer system to perform the steps of:
performing a plurality of comparisons between a pixel count of a first color in a first image and each of a plurality of pixel counts of the second image, the first image and the second image being selected from a reference image and a query image, the first image being different from the second image, the plurality of pixel counts of the second image representing pixel counts for a range of colors centered about the first color; and
classifying the query image according to the plurality of comparisons.

20. The storage medium of claim 19, wherein the instructions further cause the computer system to determine whether an electronic communication comprising the query image is spam or non-spam according to a result of classifying the query image.

* * * * *